May 2, 1967 W. KASTEN 3,317,048

FILTER UNIT

Filed June 29, 1964 2 Sheets-Sheet 1

INVENTOR.
WALTER KASTEN.
BY
William N. Antonis
ATTORNEY.

May 2, 1967 W. KASTEN 3,317,048
FILTER UNIT
Filed June 29, 1964 2 Sheets-Sheet 2
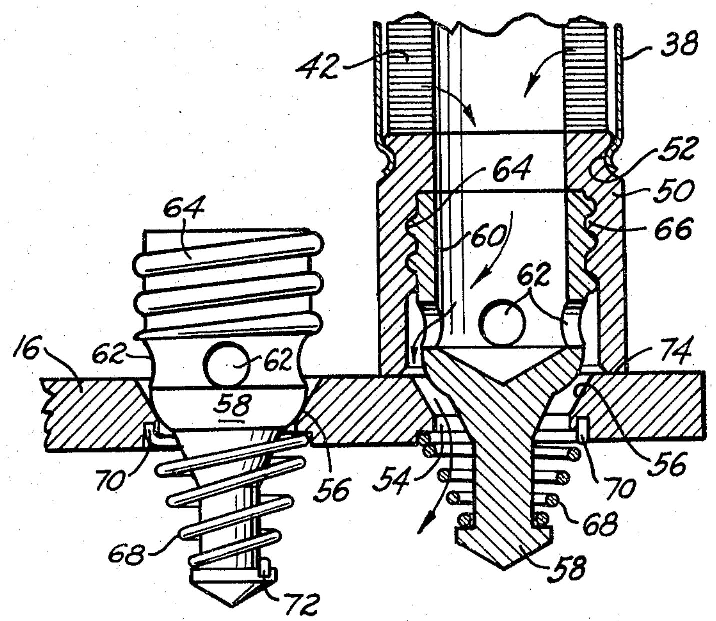
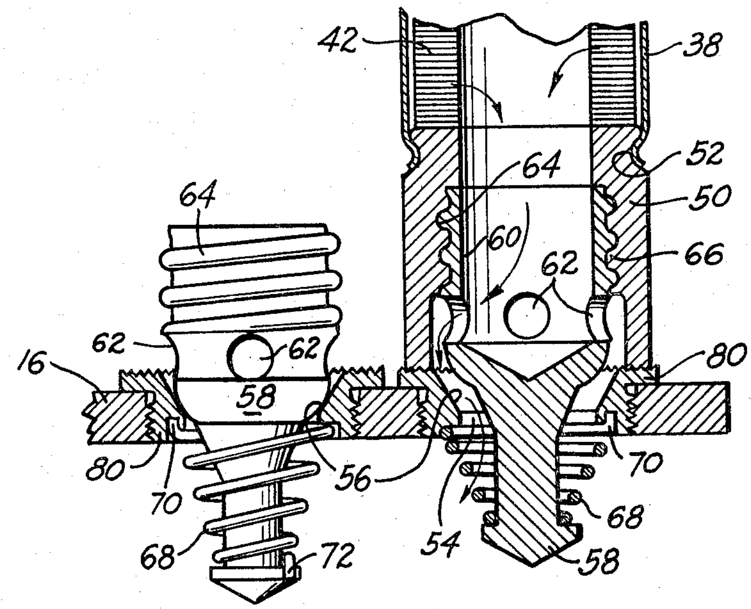
INVENTOR.
WALTER KASTEN.
BY
William N. Antonis
ATTORNEY.

United States Patent Office 3,317,048

Patented May 2, 1967

1

2

3,317,048

FILTER UNIT

Walter Kasten, Madison Heights, Mich., assignor to The Bendix Corporation, Madison Heights, Mich., a corporation of Delaware Filed June 29, 1964, Ser. No. 378,567
2 Claims. (Cl. 210—234)

This invention relates to a filter unit of the type which may be used as a fuel monitoring device and more particularly to improvements in a fuel quality testing device of the type described in my Patent No. 3,117,925.

In any filtering or fuel monitoring device which utilizes one or more replaceable filter or fuse elements, there is always the possibility that during installation or servicing one or more of these elements will have been inadvertently left out of the device. If such an omission were to occur, obviously the device would not function properly since some of the fuel would be able to flow therethrough without being checked for contaminants. Furthermore, since fuel monitoring devices of this type, because of their automatic contaminant checking features are intended to eliminate, or at least reduce, the necessity for other periodic fuel contaminant checks (e.g. Millipore and Karl Fischer samplings), it is conceivable that simply seeing such a fuel monitoring device in a fuel system, even though not properly installed, could create a false sense of security on the part of the fueling operator.

Accordingly, it is an object of this invention to provide a filtering or fuel monitoring device which will not permit the flow of contaminants therethrough even though one or more filter or fuse elements have been inadvertently left out of the device.

Another object of this invention is to provide a device of the type described which is truly "fool proof," that is, a device in which nothing could happen during its installation or operation which would allow contaminated fuel to pass therethrough unnoticed.

More specifically, it is an object of this invention to provide a filtering or fuel monitoring device which utilizes a poppet valve in conjunction with each filter or fuse element located therein for controlling flow through the port associated with said element, said poppet valve being urged by a spring to a closed position when the element associated therewith is removed or missing and being moved to an open position only upon installation of the element associated therewith.

The above and other objects and features of this invention will become apparent from the following description taken in connection with the accompanying drawings which form a part of this specification and in which:

FIGURE 2 is an enlarged fragmentary sectional view of my invention; and

FIGURE 3 is a view similar to FIGURE 2 which shows a retrofit valve kit assembly for equipping existing fuel monitoring devices with my invention.

Figure 1:
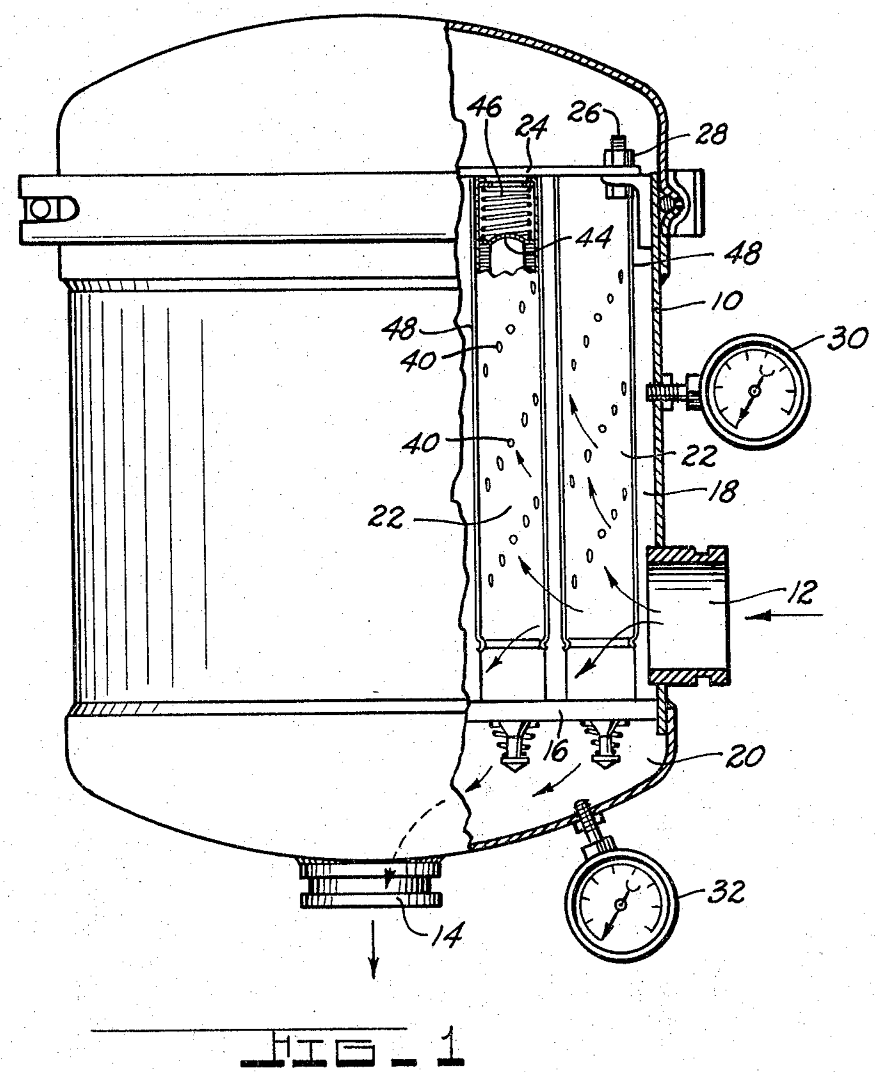
FIGURE 1 is a view partially in section of a fuel monitoring device incorporating my invention.

Referring to FIGURE 1 of the drawings, it will be seen that numeral 10 indicates a housing having a fuel inlet port 12 and a fuel outlet port 14. Suitably attached to the housing is a partition 16 which separates the interior of the housing into an inlet chamber 18 and an outlet chamber 20. A plurality of filter or fuse assemblies 22 (only two of which are shown) are attached to partition 16 in a manner hereinafter described and are retained in position by a retainer plate 24 which is operatively connected to housing 10 by three bolts 26 and nuts 28 (only one of which is shown). Pressure gages 30 and 32 may be suitably connected to the chambers for measuring the pressure differential therebetween. The direction of flow through the unit is indicated by the arrows.

Each filter or fuse assembly 22 includes a metal tubular member 38 having a plurality of perforated ports 40, a porous tubular edge-type filter element 42 formed from a plurality of washers in registered face-to-face contact, a movable endplate 44, and a spring 46 for placing the edge-type filter element under a suitable calibrated precompression. The washers may be formed from paper, cellulose, or other suitable fibrous or nonfibrous materials and are arranged so that flow through the filter element 34 will be via the radially extending pores formed between the washers. In the arrangement shown in FIGURE 1, flow will be from outside the filter element to inside the filter element. The metal wrapper 38 is formed with axially extending indentations or ribs 48 for maintaining the washers in proper alignment and is suitably connected to a plastic (polyethylene) nipple-like ferrule 50. For additional details regarding this type of fuse assembly, reference may be made to my Patent No. 3,117,925.

Referring to FIGURE 2, it will be noted that the ferrule 50 is locked to the metal tubular member 38 by crimping the member into an external groove 52 in the ferrule. A plurality of filter ports 54 are located in the partition 16, each of which contains a conical valve seat 56 formed therein. A poppet valve 58 is located in each of the filter ports 54 and is seatable on its associated valve seat 56. Each poppet valve has a bore 60 therein and a plurality of outlet ports 62 for communicating the bore with the filter port when the poppet valve has been moved to an unseated position. Formed on the external surface of the poppet valve are coarse threads 64, such as may be found on a mason jar or light bulb, which are arranged to be engaged by the mating internal coarse threads 66 formed within the ferrule 50. Each poppet valve 58 is positioned within its associated filter port 54 by a compression spring 68 which urges the poppet valve towards its valve seat, or in other words to its closed position. Both ends 70 and 72 of the compression spring are turned approximately 90° to the end faces of the spring in order to provide short dowels, one of which fits into a hole in the partition 16, and the other of which fits into a slot formed in the poppet valve. In this manner the spring (within the limits of its torsional elasticity) prevents rotation of the poppet valve during rotational engagement or disengagement with the threaded ferrule of the fuse element. The spring 68 also limits turning of the poppet which might result because of vibrations or other causes. It will be apparent from the drawings that once the internal threads 66 of the ferrule threadedly engage the external threads 64 of the poppet valve that the poppet valve 58 will be caused to move away from its valve seat 56 to an unseated or open position after the end 74 of the ferrule sealingly engages the partition 16 and is rotated further relative to the poppet valve. In other words, threading the fuse element onto the poppet will compress the spring and raise the poppet off of its valve seat in the partition, thus providing a passage for the flow of fuel from the inside of the fuse to the outlet chamber 20 via the bore 60, outlet ports 62, and filter port 54. If an operator through inadvertence should forget to install one or more of the fuse elements, contaminated fuel will not be permitted to flow through the monitoring device since the poppet valves are closed at all times and prevent flow through their associated filter ports except when the fuse elements have been properly installed.

Shown in FIGURE 3 is a retrofit valve kit assembly for equipping existing fuel monitors with my invention. This can be done simply by threading or pressing a bushing 80 containing the valve and seat assembly into the partition or division plate. Those parts which are the same as in FIGURE 2 are identified by the same numerals.

One of the advantages of my invention, in addition to making the fuel monitoring device described herein more "fool proof," is that during removal of the fuse elements, none of the accumulated solid or other contaminants upstream of the fuse element can flow into the downstream clean portion of the fuel monitoring device. Another additional advantage of my invention is that, should the operator not have a complete set of fuse elements on hand, he could operate the fuel monitoring device with a partial set. By the same token, should an operator want to use a 600 g.p.m. monitor at 300 g.p.m. and still want the same sensitivity, he only would have to remove one-half of the fuse elements and operate with the remaining half.

Furthermore, although my invention has been described in connection with a specific embodiment, it will be obvious to those skilled in the art that various changes may be made in the form, structure and arrangement of parts without departing from the spirit of the invention. For example, a bayonet type fastener or other means could be utilized in place of the threaded engagement between the fuse element and the poppet valve. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. A fluid filtering device comprising housing means having fluid inlet and outlet passage means, partition means operatively connected to said housing means and located between said inlet and outlet passage means, a plurality of filter ports located in said partition means for permitting communication between said inlet and outlet passage means, a plurality of valve seats, one of which is formed in each of said filter ports, a plurality of poppet valves, one of which is located in each of said filter ports and seatable on the valve seat formed therein, said poppet valves each having a bore therein and a plurality of outlet ports for communicating said bore with the respective filter port when said poppet valves are in an unseated position, external thread means formed on each of said poppet valves, a plurality of springs, each of which is operatively connected to said partition means and to one of said poppet valves for urging said poppet valves towards their respective valve seats and a seated position, a plurality of normally porous filtering elements of the outside-in type for filtering the fluid flowing from said inlet passage means to said outlet passage means, and a plurality of ferrules, one of which is fixedly connected to the end of each of said filtering elements, said ferrules each having internal thread means formed therein for threadedly engaging the external thread means of said poppet valves and causing said poppet valves to move away from their respective valve seats to an unseated position after said ferrules sealingly engage said partition means and are rotated relative to said poppet valves.

2. A fluid filtering device, as defined in claim 1, wherein said springs are coiled compression springs, each of which has one end thereof fixedly connected to said partition means and the other end thereof fixedly connected to one of said poppet valves for limiting relative rotation therebetween.

References Cited by the Examiner

UNITED STATES PATENTS

| | | | |
|---|---|---|---|
| 697,109 | 4/1902 | Strong | 251—348 X |
| 2,632,565 | 3/1953 | Penner | 210—234 |
| 2,768,641 | 10/1956 | Rycroft | 251—347 X |
| 2,793,752 | 5/1957 | Jay | 210—234 X |
| 2,894,630 | 7/1959 | Humbert | 210—234 X |
| 2,921,686 | 1/1960 | Forman et al. | 210—323 |
| 3,040,894 | 6/1962 | Pall | 210—235 X |
| 3,149,072 | 9/1964 | Silverman | 210—232 |

FOREIGN PATENTS

| | | |
|---|---|---|
| 686,520 | 4/1930 | France. |

REUBEN FRIEDMAN, *Primary Examiner.*

C. M. DITLOW, *Assistant Examiner.*